United States Patent
Kato et al.

(10) Patent No.: US 12,498,048 B2
(45) Date of Patent: Dec. 16, 2025

(54) MIXING VALVE

(71) Applicant: MIKUNI CORPORATION, Tokyo (JP)

(72) Inventors: Hiroshi Kato, Odawara (JP); Hideaki Kashiwagura, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 19 days.

(21) Appl. No.: 18/757,702

(22) Filed: Jun. 28, 2024

(65) Prior Publication Data
US 2025/0012366 A1    Jan. 9, 2025

(30) Foreign Application Priority Data
Jul. 7, 2023   (JP) .................................. 2023-111955

(51) Int. Cl.
*F16K 11/085*    (2006.01)
(52) U.S. Cl.
CPC ............................... *F16K 11/0853* (2013.01)
(58) Field of Classification Search
CPC .. F16K 11/0853; B01F 25/1051; B01F 23/45; B01F 35/80
See application file for complete search history.

(56) References Cited

U.S. PATENT DOCUMENTS

| | | | | |
|---|---|---|---|---|
| 4,972,877 | A * | 11/1990 | Halemba | F16K 11/0853 |
| | | | | 137/625.29 |
| 8,899,269 | B2 * | 12/2014 | Seim | F16K 11/085 |
| | | | | 137/454.6 |
| 11,846,358 | B1 * | 12/2023 | Grissom | F16K 5/0464 |

FOREIGN PATENT DOCUMENTS

JP    2010-1925    1/2010

* cited by examiner

*Primary Examiner* — Michael R Reid
(74) *Attorney, Agent, or Firm* — STAAS & HALSEY LLP

(57) ABSTRACT

A mixing valve includes: a housing with a valve chamber formed therein; and a rotor rotatably inserted into the valve chamber, a first peripheral wall of the housing is provided with a first inlet port at a first opening to the valve chamber and a second inlet port at a second opening to the valve chamber, a second peripheral wall of the rotor is provided with a first inflow pipe, a second inflow pipe, and a mixing pipe with a mixing flow path formed therein, the mixing pipe opens in a radial direction of the rotor and communicates with the first inflow pipe and the second inflow pipe to allow a mixed fluid MF to flow into the mixing pipe, and the first peripheral wall of the housing is provided with a discharge port a discharge fluid DF that has flowed into the valve chamber without passing through the first inflow pipe and/or the second inflow pipe of the rotor, respectively, and an outlet port communicating with the mixing flow path.

5 Claims, 7 Drawing Sheets

MIXING VALVE

CROSS REFERENCE TO RELATED APPLICATIONS

This application claims priority benefit from Japanese Patent Application No. 2023-111955 filed on Jul. 7, 2023 the contents which are incorporated herein by reference.

BACKGROUND OF THE INVENTION

Field of the Invention

The present invention relates to a mixing valve and particularly to a mixing valve capable of mixing different fluids at a predetermined flow amount ratio and thereby obtaining a desired mixed fluid.

Description of the Related Art

Japanese Patent Laid-Open No. 2010-1925 discloses a flow regulating valve capable of adjusting a ratio at which water and hot water are mixed and thereby obtaining warm water at a desired temperature. The flow regulating valve is for use in a hot-water supply and the like and includes a valve main body including a cylindrical valve chamber and a valve body rotatably inserted into the valve chamber. The valve main body includes two side ports into which water and hot water flow, respectively, and a bottom port from which mixed warm water flows out. Each side port is opened into the valve chamber, and a ratio at which water and hot water are mixed is adjusted by an opening area of each side port changing with rotation of the valve body.

If the opening area of each side port, in other words, each inlet port decreases with rotation of the valve body, a flow of the fluid on the upstream side of each inlet port stagnates. For example, consider the case where there is a heat exchanger to adjust a temperature of a fluid on the upstream side of the flow regulating valve, in other words, the mixing valve. In this case, the flow of the fluid may stagnate due to the narrowing of the flow path at the mixing valve and heat exchange efficiency of the fluid in the heat exchanger may be degraded. Therefore, there has been a need for a mixing valve that does not hinder the flow of the fluid on the upstream side and can thus minimize influences on devices disposed on the upstream side.

Also, since the bottom port, in other words, the outlet port extends in an axial direction of the valve body, the dimension of the mixing valve in a height direction increases. Moreover, since a hose connecting direction is split to the radial direction and the axial direction of the valve body when the hose or the like is connected to each inlet port and the outlet port, handling of the hose becomes complicated, and workability when the mixing valve is installed deteriorates. Furthermore, since it is not possible to keep the hose or the like to be connected to each inlet port and the outlet port compact, it is difficult to save a space around the mixing valve.

An object of the present invention, which has been made in view of such problems, is to provide a mixing valve capable of minimizing influences on devices disposed on an upstream side by not hindering a flow of a fluid on the upstream side, realizing a compact size and space saving, and further improving workability related to installation.

SUMMARY OF THE INVENTION

In order to achieve the above object, a mixing valve according to the present invention includes: a cylindrical housing with a valve chamber formed therein; and a rotor rotatably inserted into the valve chamber, the housing is provided with, in a first peripheral wall of the housing, a first inlet port having a first opening at the valve chamber and a second inlet port having a second opening at the valve chamber, a first fluid flowing into the first inlet port, a second fluid flowing into the second inlet port, the rotor includes, in a second peripheral wall of the rotor, a first inflow pipe communicating with the first opening, a second inflow pipe communicating with the second opening, and a mixing pipe forming a mixing flow path through which the first fluid and/or the second fluid flow as a mixed fluid, the mixing pipe opens in a radial direction of the rotor and communicates with the first inflow pipe and the second inflow pipe to allow the mixed fluid to flow into the mixing pipe, and the first peripheral wall of the housing is provided with a discharge port discharging the first fluid and/or the second fluid that has flowed into the valve chamber without passing through the first inflow pipe and/or the second inflow pipe of the rotor, respectively, as a discharge fluid to the outside of the housing, and an outlet port communicating with the mixing pipe.

According to the present invention, it is possible to provide a mixing valve capable of minimizing influences on devices disposed on an upstream side by not hindering a flow of a fluid on the upstream side, realizing a compact size and space saving, and further improving workability related to installation.

DETAILED DESCRIPTION OF THE INVENTION

Figure 1:
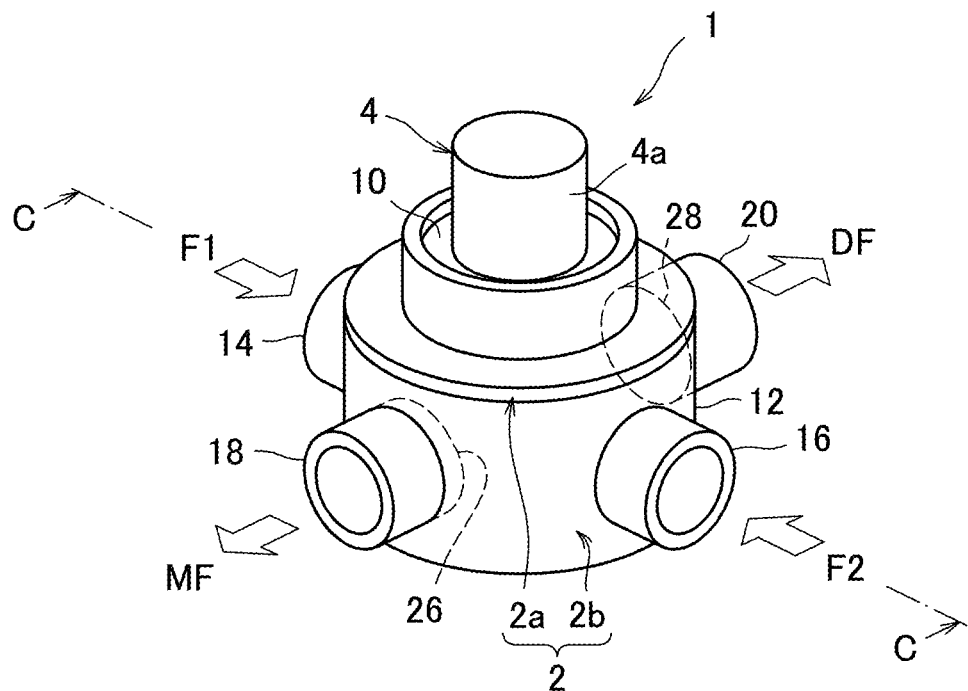
FIG. 1 is a perspective view of a mixing valve according to an embodiment of the present invention.
Figure 2:
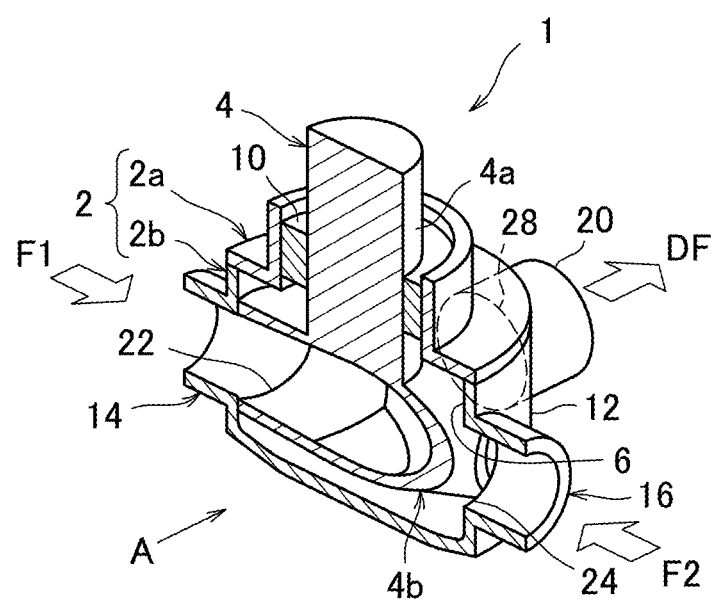
FIG. 2 is a vertical sectional view of the mixing valve in FIG. 1.

FIG. 1 illustrates a perspective view of a mixing valve 1 according to an embodiment of the present invention, and FIG. 2 illustrates a vertical sectional view of the mixing valve 1 in FIG. 1. The mixing valve 1 includes a cylindrical housing 2 that is a valve main body and a rotor 4 that is a valve body. A valve chamber 6 is formed inside the housing 2, and the rotor 4 is rotatably inserted into the valve chamber 6. Specifically, the rotor 4 includes an upper drive shaft 4a and a lower pipe portion 4b. The drive shaft 4a is driven and rotated by an actuator such as a stepping motor, which is not illustrated.

The housing 2 is formed by welding an upper lid member 2a and a lower tubular member 2b, for example. The drive shaft 4a of the rotor 4 is rotatably supported by an inner circumferential surface of the lid member 2a of the housing 2 via a shaft seal device 10. The shaft seal device 10 is configured by a sealing member such as an O ring and a shaft bearing such as a bearing, and the valve chamber 6 is sealed and sectioned inside the housing 2 by the shaft seal device 10.

A first peripheral wall 12 formed in the tubular member 2b is provided with a first inlet port 14, a second inlet port 16, an outlet port 18, and a discharge port 20. In the present embodiment, all of the first inlet port 14, the outlet port 18, the second inlet port 16, and the discharge port 20 are provided to project in a radial direction of the housing 2 from the first peripheral wall 12 in this order at positions substantially at angles of 90 degrees in the counterclockwise circumferential direction of the first peripheral wall 12 when seen in FIG. 1.

Specifically, each of the ports 14, 16, 18, and 20 is provided to project in the radial direction of the housing 2 from the first peripheral wall 12 on the same radial-direction plane of the housing 2. The first inlet port 14 has a first opening 22 at the valve chamber 6, and a first fluid F1 flows into the first inlet port 14. The second inlet port 16 has a second opening 24 at the valve chamber 6, and a second fluid F2 flows into the second inlet port 16. The outlet port 18 has a third opening 26 at the valve chamber 6 and communicates with a mixing pipe 36, which will be described later, to allow a mixed fluid MF of the first fluid F1 and/or the second fluid F2 to flow out from the outlet port 18. The discharge port 20 has a fourth opening 28 at the valve chamber 6, and a discharge fluid DF flows out from the discharge port 20.

Figure 3:
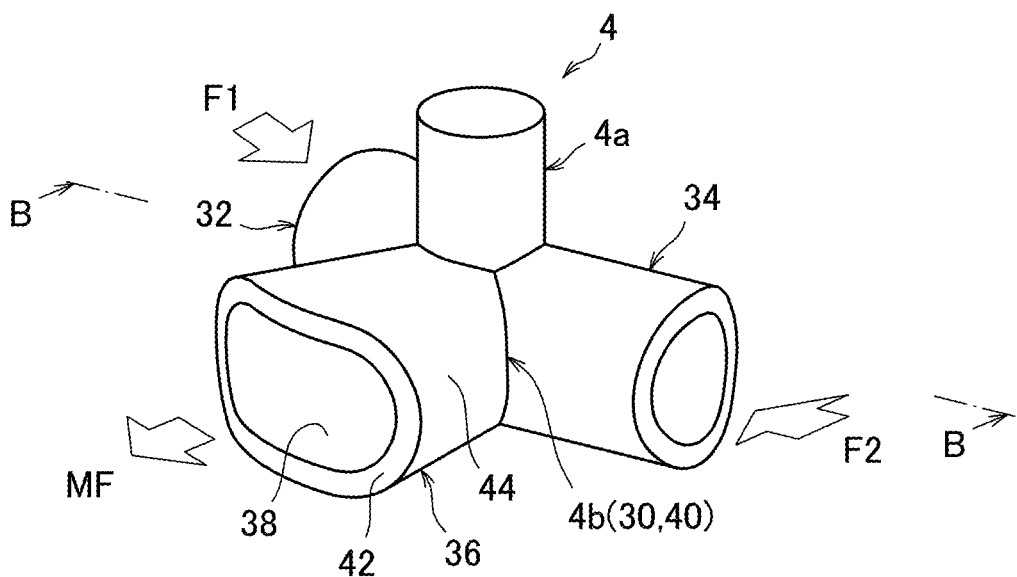
FIG. 3 is a perspective view of a rotor seen in a direction A in FIG. 2.
Figure 4:
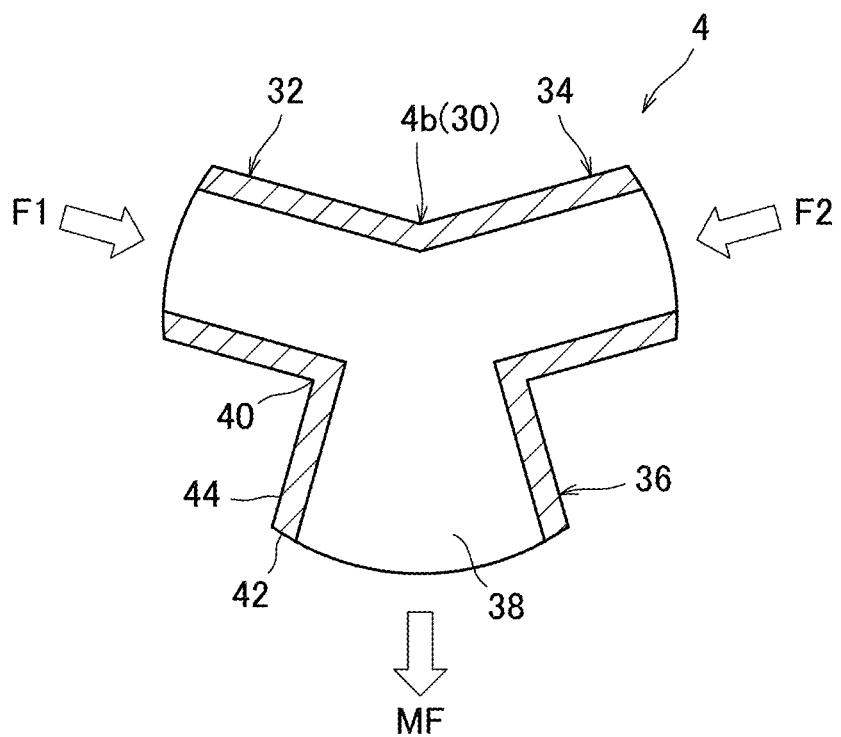
FIG. 4 is a horizontal sectional view of the rotor in FIG. 3 in a direction B-B.

FIG. 3 illustrates a perspective view of the rotor 4 seen in a direction A in FIG. 2, and FIG. 4 illustrates a horizontal sectional view of the rotor 4 in FIG. 3 in a direction B-B. A second peripheral wall 30 formed in the pipe portion 4b of the rotor 4 is provided with a first inflow pipe 32 into which the first fluid F1 flows from the first inlet port 14, a second inflow pipe 34 into which the second fluid F2 flows from the second inlet port 16, and a mixing pipe 36 from which the mixed fluid MF flows out.

In the present embodiment, all of the first inflow pipe 32, the mixing pipe 36, and the second inflow pipe 34 are provided to project in the radial direction of the rotor 4 from the second peripheral wall 30 in this order at positions substantially at angles of 90 degrees in the counterclockwise circumferential direction of the second peripheral wall 30 when seen in FIGS. 3 and 4. Specifically, the first inflow pipe 32, the second inflow pipe 34, and the mixing pipe 36 are provided to project in the radial direction of the pipe portion 4b from the second peripheral wall 30 in the same radial-direction plane of the pipe portion 4b of the rotor 4.

A mixing flow path 38 through which the mixed fluid MF flows is formed in the mixing pipe 36. Also, the mixing pipe 36 includes a connecting portion 40 connected to the second peripheral wall 30 and an opening end 42 that comes into slide contact with an inner circumferential surface of the housing 2 via a sealing member 54 (see FIG. 5), which will be described later, with rotation of the rotor 4. A third peripheral wall 44 of the mixing pipe 36 has an enlarged pipe shape with a diameter increasing from the connecting portion 40 toward the opening end 42. Note that the mixing pipe 36 in the present embodiment has a slightly flattened enlarged pipe shape.

Figure 5:
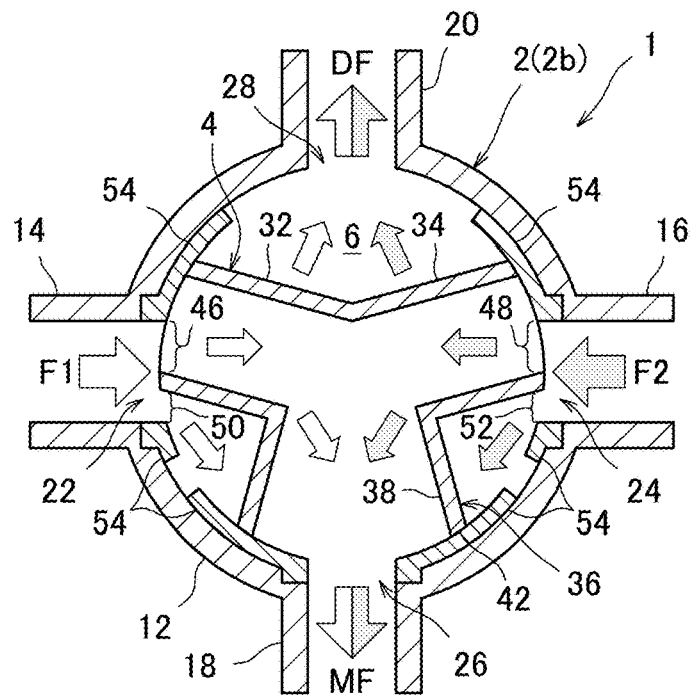
FIG. 5 is a horizontal sectional view of the mixing valve in FIG. 1 in a direction C-C.

FIG. 5 illustrates a horizontal sectional view of the mixing valve 1 in FIG. 1 in a direction C-C. The first inflow pipe 32 communicates with the mixing flow path 38, and a first communication region 46 of the first inflow pipe 32 communicating with the first opening 22 changes with rotation of the rotor 4. Also, the second inflow pipe 34 communicates with the mixing flow path 38, and a second communication region 48 of the second inflow pipe 34 communicating with the second opening 24 changes with rotation of the rotor 4.

Here, a first non-communication region 50 may be formed in the first opening 22 in the present embodiment. The first non-communication region 50 communicates with the valve chamber 6 in accordance with rotation of the rotor 4 but does not communicate with the first inflow pipe 32. On the other hand, a second non-communication region 52 may be formed in the second opening 24. The second non-communication region 52 communicates with the valve chamber 6 in accordance with rotation of the rotor 4 but does not communicate with the second inflow pipe 34.

The first fluid F1 and/or the second fluid F2 that has flowed into the valve chamber 6 through the first non-communication region 50 and/or the second non-communication region 52, respectively, flows through a space in the valve chamber 6 below the rotor 4 and is then discharged as the discharge fluid DF to the outside of the housing 2 via the discharge port 20. In other words, the first fluid F1 that has flowed in from the first opening 22 and has not passed through the first inflow pipe 32 flows into the valve chamber 6, the second fluid F2 that has flowed into the second opening 24 and has not passed through the second inflow pipe 34 flows into the valve chamber 6, and the first fluid F1 and the second fluid F2 are mixed in the valve chamber 6 and are discharged as the discharge fluid DF to the outside of the housing 2 via the discharge port 20.

The discharge fluid DF is appropriately used in a temperature adjustment system 56, which will be described later, or the like. Note that as illustrated in FIG. 5, sealing members 45 with which the first inflow pipe 32, the second inflow pipe 34, and the mixing pipe 36 smoothly come into slide contact with rotation of the rotor 4 to thereby tightly seal the valve chamber 6 are attached to inner circumferential surfaces of the tubular member 2b of the housing 2 in the vicinity of the first opening 22, the second opening 24, and the third opening 26.

On the other hand, the first fluid F1 flowing through the first communication region 46 of the first inflow pipe 32 and the second fluid F2 flowing through the second communication region 48 of the second inflow pipe 34 flow through the mixing flow path 38 formed in the mixing pipe 36 of the rotor 4 and flow out as the mixed fluid MF from the outlet port 18. The mixed fluid MF is appropriately used in the temperature adjustment system 56, which will be described later, or the like. Note that in the case illustrated in FIG. 5, a ratio of the first communication region 46 occupying the area of the first opening 22, in other words, an opening degree of the first inflow pipe 32 is 50%, and the ratio of the second communication region 48 occupying the area of the second opening 24, in other words, an opening degree of the second inflow pipe 34 is 50%, and the rotation position of the rotor 4 in this case will be referred to as R2.

Figure 6:
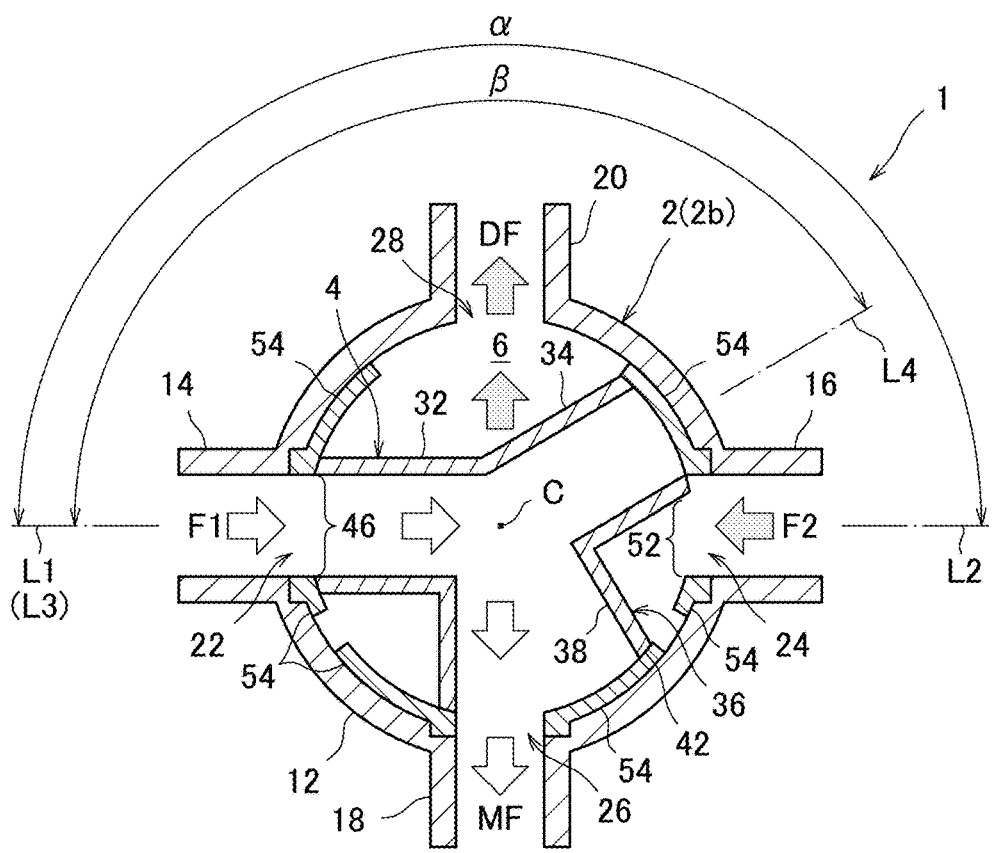
FIG. 6 is a horizontal sectional view of the mixing valve in a case where a first communication region is an entire region of a first opening.

FIG. 6 illustrates a horizontal sectional view of the mixing valve 1 in a case where the first communication region 46 is an entire region of the first opening 22. In the case illustrated in FIG. 6, an opening degree of the first inflow pipe 32 is 100%, an opening degree of the second inflow pipe 34 is 0%, and only the first fluid F1 flowing through the first communication region 46 of the first inflow pipe 32 flows through the mixing flow path 38 and then flows out from the outlet port 18. On the other hand, the second fluid F2 passing through the second non-communication region 52 flows through the space in the valve chamber 6 below the rotor 4 and is then discharged as the discharge fluid DF from the discharge port 20. Note that the rotation position of the rotor 4 in this case will be referred to as R1.

Figure 7:
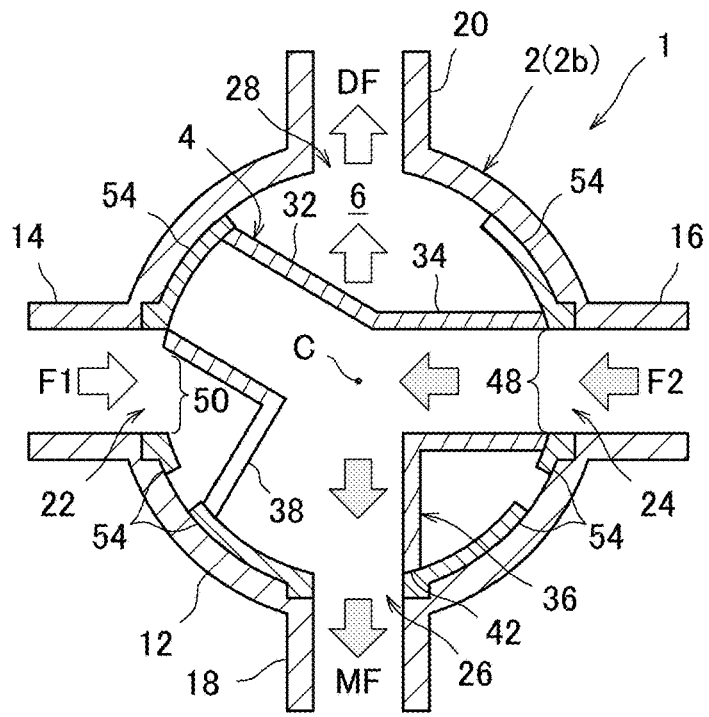
FIG. 7 is a horizontal sectional view of the mixing valve in a case where a second communication region is an entire region of a second opening.

FIG. 7 illustrates a horizontal sectional view of the mixing valve 1 in a case where the second communication region 48 is an entire region of the second opening 24. In the case illustrated in FIG. 7, an opening degree of the first inflow pipe 32 is 0%, an opening degree of the second inflow pipe 34 is 100%, and only the second fluid F2 flowing through the second communication region 48 of the second inflow pipe 34 flows through the mixing flow path 38 and then flows out from the outlet port 18. On the other hand, the first fluid F1 passing through the first non-communication region 50 flows through the space in the valve chamber 6 below the rotor 4 and is then discharged as the discharge fluid DF from the discharge port 20. Note that the rotation position of the rotor 4 in this case will be referred to as R3.

Figure 8:
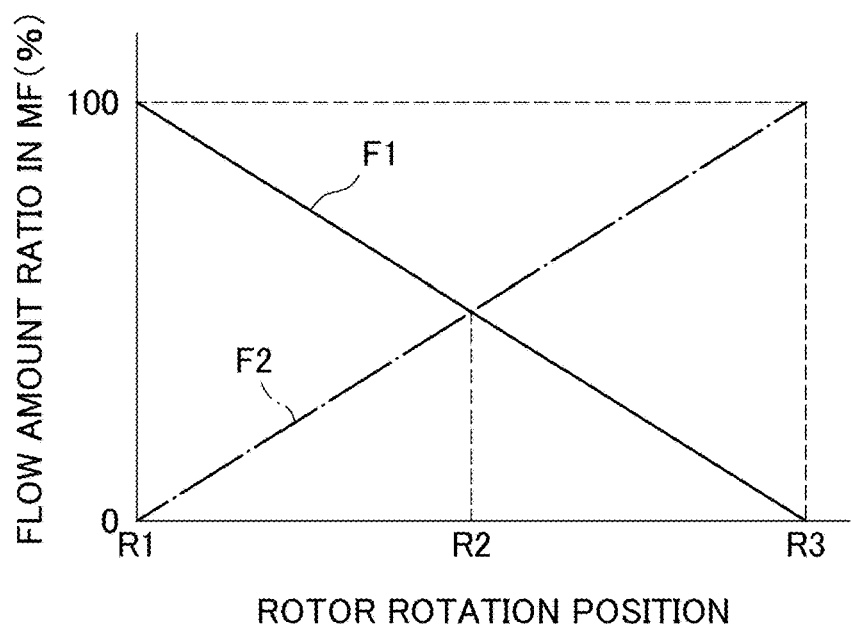
FIG. 8 is a graph representing a flow amount ratio of a first fluid and a second fluid in a mixed fluid in accordance with a rotation position of the rotor.
Figure 9:
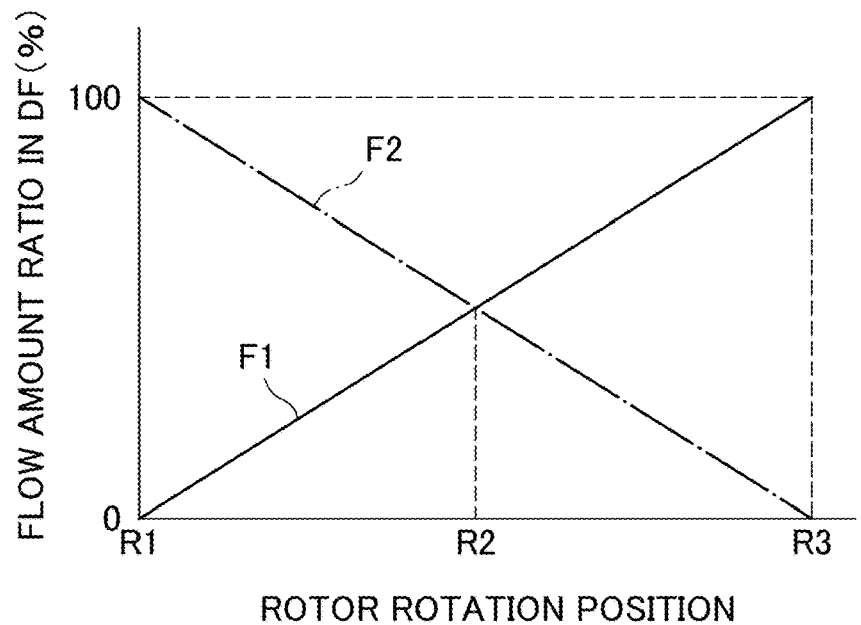
FIG. 9 is a graph representing a flow amount ratio of the first fluid and the second fluid in a discharged fluid in accordance with the rotation position of the rotor.

FIG. 8 illustrates a graph representing a flow amount ratio of the first fluid F1 and the second fluid F2 in the mixed fluid MF in accordance with the rotation position of the rotor 4, and FIG. 9 illustrates a graph representing a flow amount ratio of the first fluid F1 and the second fluid F2 in the discharge fluid DF in accordance with the rotation position of the rotor 4. At the rotation position R1, the mixed fluid MF includes 100% of the first fluid F1 as illustrated in FIG. 6 as well. In this case, the second opening 24 of the second inlet port 16 is completely covered with the rotor 4, and the second fluid F2 is held back in the related art.

Therefore, the flow of the second fluid F2 on the upstream side of the second inlet port 16 completely stagnates in the related art. However, in the present embodiment, the discharge fluid DF including 100% of the second fluid F2 is caused to flow through the valve chamber 6 and is then discharged from the discharge port 20 at the rotation position R1. In this manner, flows of both the first fluid F1 and the second fluid F2 on the upstream side of the mixing valve 1 are not hindered.

On the other hand, the mixed fluid MF includes 50% each of the first fluid F1 and the second fluid F2 as illustrated in FIG. 5 as well at the rotation position R2. Therefore, each of the flow of the first fluid F1 on the upstream side of the first inlet port 14 and the flow of the second fluid F2 on the upstream side of the second inlet port 16 stagnates to about ½ in the related art. However, in the present embodiment, the discharge fluid DF including 50% each of the first fluid F1 and the second fluid F2 is caused to flow through the valve chamber 6 and is then discharged from the discharge port 20 at the rotation position R2. In this manner, flows of both the first fluid F1 and the second fluid F2 on the upstream side of the mixing valve 1 are not hindered.

On the other hand, the mixed fluid MF includes 100% of the second fluid F2 as illustrated in FIG. 7 as well at the rotation position R3. Therefore, the flow of the first fluid F1 on the upstream side of the first inlet port 14 completely stagnates in the related art. However, in the present embodiment, the discharge fluid DF including 100% of the first fluid F1 is caused to flow through the valve chamber 6 and is then discharged from the discharge port 20 at the rotation position R3. In this manner, flows of both the first fluid F1 and the second fluid F2 on the upstream side of the mixing valve 1 are not hindered.

In this manner, the flows of both the first fluid F1 and the second fluid F2 on the upstream side of the mixing valve 1 are not hindered regardless of the rotation position of the rotor 4, and it is thus possible to minimize influences on devices disposed on the upstream side of the mixing valve 1. As is obvious from FIGS. 5 to 7, the opening area of the mixing pipe 36 at the opening end 42 is a size that allows communication with the entire region of the third opening 26 of the outlet port 18 in the entire rotation range of the rotor 4.

Furthermore, in a case where a first line L1 connecting a rotation center C of the rotor 4 to a center of the first opening 22 in the radial direction and a second line L2 connecting the rotation center C to a center of the second opening 24 in the radial direction are defined in the same radial-direction plane of the housing 2 as illustrated in FIG. 6, an intersection angle on the side of a region where the discharge port 20 is provided is defined as a fluid inflow angle α. Also, in a case where a third line L3 (the same as the first line L1 in FIG. 6) connecting the rotation center C to a center of the opening of the first inflow pipe 32 in the radial direction and a fourth line L4 connecting the rotation center C to a center of the opening of the second inflow pipe 34 in the radial direction are defined in the same radial-direction plane of the housing 2, an intersection angle on the side of the region where the discharge port 20 is provided is defined as a fluid mixing angle β.

At this time, the fluid mixing angle β and the fluid inflow angle α are set to different angles, and preferably, the fluid mixing angle β is set to be smaller than the fluid inflow angle α. In the present embodiment, the fluid inflow angle β is an obtuse angle of less than 180 degrees (about 120 degrees), while the fluid inflow angle α is substantially 180 degrees. It is possible to secure a broader region between the first inlet port 14 and the second inlet port 16 than the rotation region of the rotor 4 around the rotation center C at the center by such a relationship between the fluid inflow angle α and the fluid mixing angle β being satisfied in the mixing valve 1. Therefore, it is possible to form the first non-communication region 50 and/or the second non-communication region 52, to cause the first fluid F1 and/or the second fluid F2 to flow into the valve chamber 6, and to discharge the fluids as the discharge fluid DF from the discharge port 20.

Figure 10:
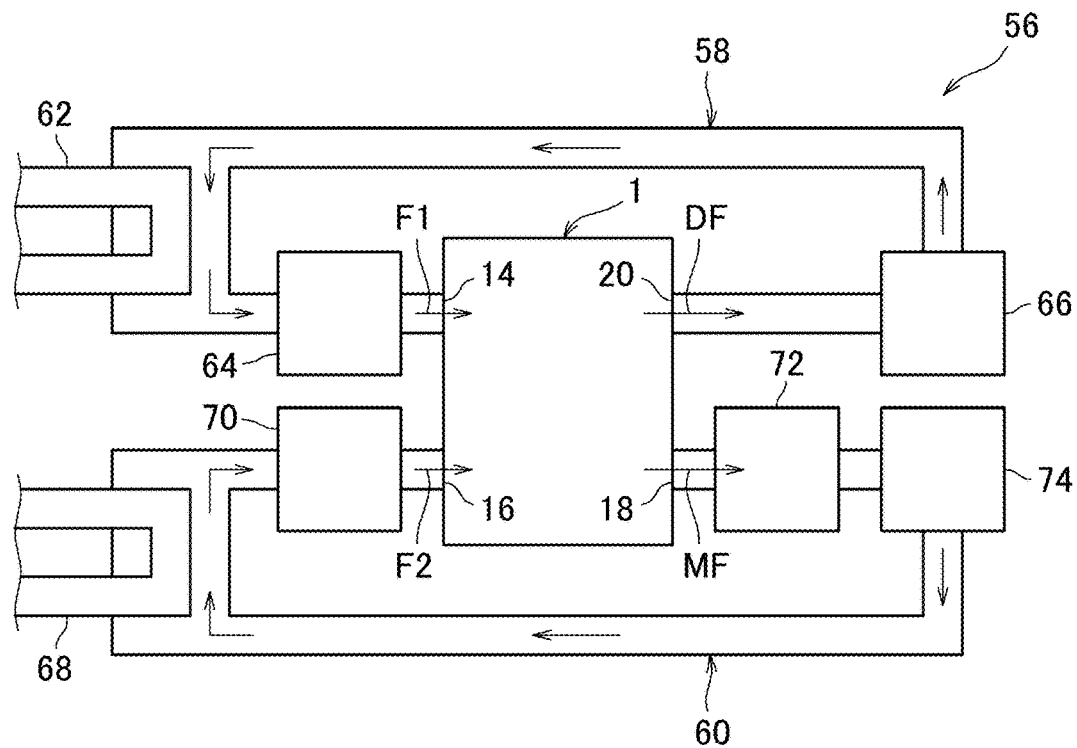
FIG. 10 is a configuration diagram of a temperature adjustment system in which the mixing valve is installed.

FIG. 10 is a configuration diagram of the temperature adjustment system 56 in which the mixing valve 1 is installed. The temperature adjustment system 56 is mounted in a vehicle such as an electric vehicle or a hybrid vehicle, for example, and includes a radiator cooling water circuit 58 and a battery cooling water circuit 60. A heat exchange unit 62 for a heat exchanger for cooling, an electric pump 64, the mixing valve 1, and a radiator 66 are inserted into the radiator cooling water circuit 58 in the order in a direction of a water flow.

In the radiator cooling water circuit 58, cooling water cooled by the heat exchange unit 62 is sent out by the electric pump 64 and flows into the first inlet port 14 of the mixing valve 1 as the first fluid F1. Thereafter, cooling water as the discharge fluid DF is fed to the radiator 66 from the discharge port 20, and the cooling water is used for heat dissipation of devices mounted in the vehicle.

On the other hand, a heat exchange unit 68 for a heat exchanger for heating, an electric pump 70, the mixing valve 1, a battery 72, and an electric power train 74 are inserted into the battery cooling water circuit 60 in the order in the direction of the water flow. In the battery cooling water circuit 60, warm water heated by the heat exchange unit 68 is sent out by the electric pump 70 and flows into the second inlet port 16 of the mixing valve 1 as the second fluid F2. Thereafter, the warm water is fed to the battery 72 from the outlet port 18 as the mixed fluid MF, and the warm water heats the battery 72 exposed to a low-temperature environment.

The water after heating the battery 72 is fed to the electric power train 74 and is used for heat dissipation of an inverter, a motor, and the like configuring the electric power train 74. In the temperature adjustment system 56, it is also possible to cool the battery 72 in a high-temperature environment or during a long-time traveling of the vehicle by changing the flow amount ratio of the first fluid F1 (cooling water) and the second fluid F2 (warm water) in the mixed fluid MF through rotation of the rotor 4.

Also, flows of both the first fluid F1 and the second fluid F2 on the upstream side of the mixing valve 1 are not hindered regardless of the rotation position of the rotor 4 as described above. Therefore, since the flows of the first fluid F1 and the second fluid F2 do not stagnate on the upstream side, which is the upstream side of the mixing valve 1, it is possible to prevent degradation of heat exchange efficiency in the heat exchange units 62 and 68 disposed on the upstream side of the mixing valve 1.

As described above, the first non-communication region 50 may be formed in the first opening 22 of the first inlet port 14 in the mixing valve 1 according to the present embodiment, and the first non-communication region 50 communicates with the valve chamber 6 in accordance with rotation of the rotor 4 but does not communicate with the first inflow pipe 32. Also, the second non-communication region 52 may be formed in the second opening 24 of the second inlet port 16, and the second non-communication region 52 communicates with the valve chamber 6 in accordance with rotation of the rotor 4 but does not communicate with the second inflow pipe 34.

The first fluid F1 and/or the second fluid F2 that has flowed into the valve chamber 6 through the first non-communication region 50 and/or the second non-communication region 52, respectively, is discharged as the discharge fluid DF to the outside of the housing 2 via the discharge port 20. In this manner, the flows of both the first fluid F1 and the second fluid F2 on the upstream side of the mixing valve 1 are not hindered regardless of the rotation position of the rotor 4. Therefore, it is possible to minimize influences on devices disposed on the upstream side of the mixing valve 1, and specifically, to prevent degradation of heat exchange efficiency in the heat exchange units 62 and 68 as described above.

Also, the first peripheral wall 12 of the housing 2 is provided with the discharge port 20 from which the discharge fluid DF is discharged and the outlet port 18 communicating with the mixing pipe 36 to allow the mixed fluid MF to flow out from the outlet port 18, in addition to the first inlet port 14 into which the first fluid F1 flows and the second inlet port 16 into which the second fluid F2 flows. In other words, it is possible to shorten the length of the rotor 4 in the axial direction by providing all of the ports 14, 16, 18, and 20 in the first peripheral wall 12 of the housing 2, to thereby minimize the dimension of the mixing valve 1 in the height direction, and to realize the mixing valve 1 in a considerably compact size.

Also, since the ports 14, 16, 18, and 20 are disposed in the circumferential direction of the first peripheral wall 12 of the housing 2, it becomes easy to handle a hose or the like to be connected to the ports 14, 16, 18, and 20, and it is thus possible to improve workability when the mixing valve 1 is installed. Also, it is possible to keep the hose or the like to be connected to the ports 14, 16, 18, and 20 compact in the circumferential direction of the first peripheral wall 12 and to thereby save the space around the mixing valve 1.

Also, the first inlet port 14, the second inlet port 16, the outlet port 18, and the discharge port 20 are provided to project in the radial direction of the housing 2 from the first peripheral wall 12 on the same radial-direction plane of the housing 2. In this manner, it is possible to further effectively promote the formation of the mixing valve 1 in a compact size, the improvement in workability when the mixing valve 1 is installed, and the space saving around the mixing valve 1 described above.

Also, the opening area of the mixing pipe 36 at the opening end 42 is a size that allows communication with the entire region of the third opening 26 of the outlet port 18 in the entire rotation range of the rotor 4. In this manner, the flow of the mixed fluid MF is not hindered regardless of the rotation position of the rotor 4, and it is thus possible to more reliably avoid influences on devices disposed on the upstream side of the mixing valve 1.

Moreover, the third peripheral wall 44 of the mixing pipe 36 has an enlarged pipe shape with a diameter increasing from the connecting portion 40 toward the opening end 42. It is thus possible to reduce the diameters of the drive shaft 4a and the pipe portion 4b of the rotor 4 while securing the aforementioned opening area of the mixing pipe 36 at the opening end 42. Therefore, it is possible to further effectively promote the formation of the mixing valve 1 in a compact size.

Also, when the aforementioned fluid inflow angle $\alpha$ and fluid mixing angle $\beta$ are defined, the fluid mixing angle $\beta$ is smaller than the fluid inflow angle $\alpha$. It is thus possible to secure a broader region between the first inlet port 14 and the second inlet port 16 than the rotation region of the rotor 4 around the rotation center C at the center. Therefore, it is possible to form the first non-communication region 50 and/or the second non-communication region 52, to cause the first fluid F1 and/or the second fluid F2 to flow into the valve chamber 6, and to discharge the first fluid F1 and/or the second fluid F2 as the discharge fluid DF from the discharge port 20.

Therefore, it is possible to realize the mixing valve 1 that does not hinder the flow of the fluid on the upstream side and can minimize influences on devices disposed on the upstream side merely by adjustment of setting the positions of the first inlet port 14 and the second inlet port 16 in the housing 2 and the positions of the first inflow pipe 32 and the second inflow pipe 34 in the rotor 4 such that the fluid mixing angle $\beta$ is smaller than the fluid inflow angle $\alpha$.

Figure 11:
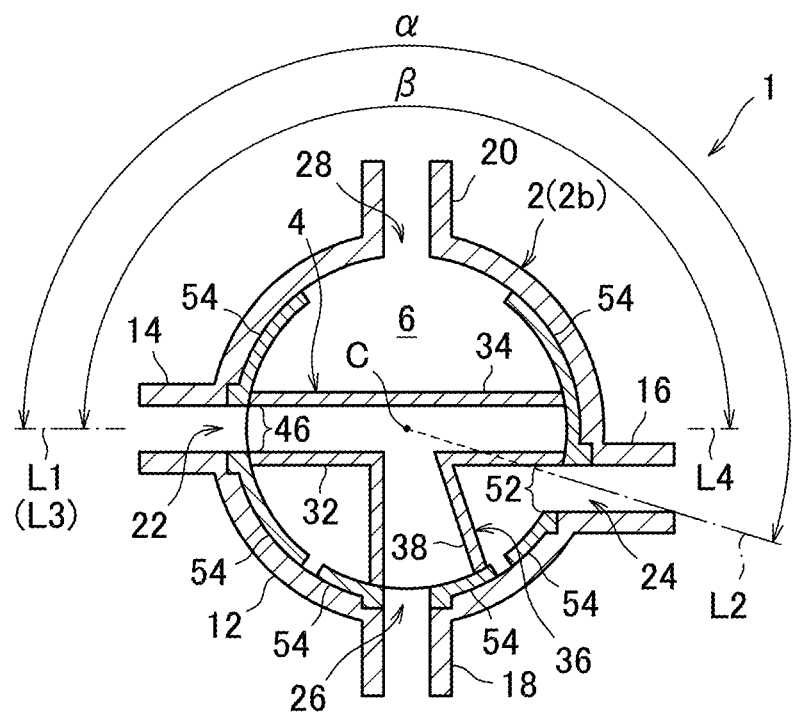
FIG. 11 is a horizontal sectional view of a mixing valve according to a modification.

Although the embodiment of the present invention has been described hitherto, the present invention is not limited thereto, and various modifications can be made without departing from the gist of the present invention. For example, the rotor 4 with a fluid mixing angle $\beta$ of substantially 180 degrees may be employed as illustrated in FIG. 11, and in this case, it is only necessary to provide the second inlet port 16 to project at a position at an angle that is substantially larger than 180 degrees in the clockwise circumferential direction of the first peripheral wall 12 from the first inlet port 14.

In this manner, the fluid inflow angle α is larger than 180 degrees, and the fluid mixing angle β is thus smaller than the fluid inflow angle α. Therefore, since the aforementioned relationship between the fluid inflow angle α and the fluid mixing angle β is established in this case as well, it is possible to realize the mixing valve 1 that does not hinder the flow of the fluid on the upstream side. Also, the first inlet port 14, the second inlet port 16, the outlet port 18, and the discharge port 20 may not be provided to project in the radial direction of the housing 2 from the first peripheral wall 12 like the second inlet port 16 illustrated in FIG. 11.

Figure 12:
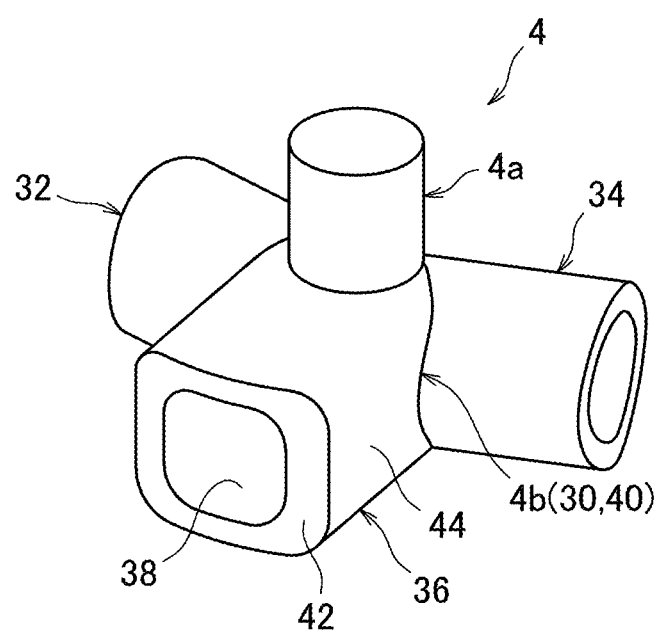
FIG. 12 is a perspective view of a rotor according to a modification.
Figure 13:
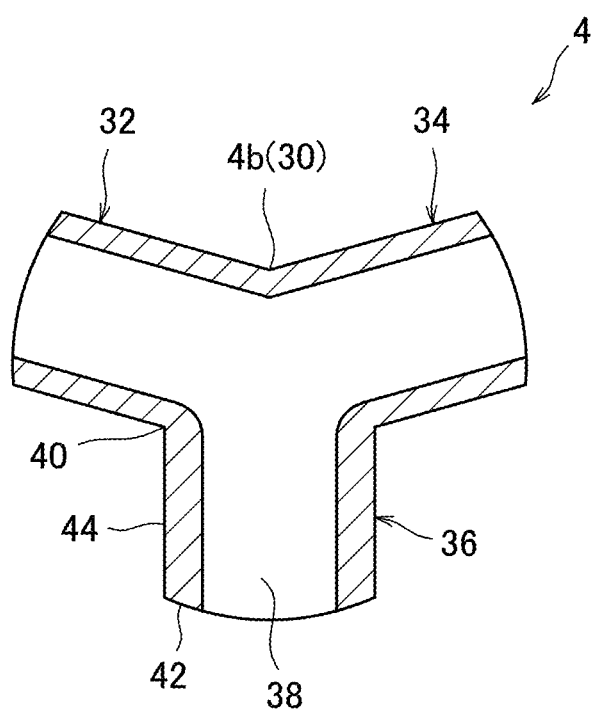
FIG. 13 is a horizontal sectional view of the rotor in FIG. 12.

Moreover, the aforementioned mixing pipe 36 has an enlarged pipe shape. However, the mixing pipe 36 is not limited thereto and may have a square pipe shape in which the third peripheral wall 44 does not have a diameter increasing from the connecting portion 40 toward the opening end 42 as illustrated in FIGS. 12 and 13, for example, or may have a simple pipe shape. Also, the mixing valve 1 according to the present embodiment can be used not only to mix cooling water and warm water in the aforementioned temperature adjustment system 56 but also to mix various fluids that are not limited to liquids but also include gas in systems for various kinds of adjustment that is not limited to temperature adjustment.

REFERENCE SIGNS LIST

1 mixing valve
2 housing
4 rotor
6 valve chamber
12 first peripheral wall
14 first inlet port
16 second inlet port
18 outlet port
20 discharge port
22 first opening
24 second opening
26 third opening
30 second peripheral wall
32 first inflow pipe
34 second inflow pipe
36 mixing pipe
38 mixing flow path
40 connecting portion
42 opening end
44 third peripheral wall
46 first communication region
48 second communication region
50 first non-communication region
52 second non-communication region
c rotation center
F1 first fluid
F2 second fluid
MF mixed fluid
DF discharge fluid
L1 first line
L2 second line
L3 third line
L4 fourth line
α fluid inflow angle
β fluid mixing angle

What is claimed is:

1. A mixing valve comprising:
a cylindrical housing with a valve chamber formed therein; and
a rotor rotatably inserted into the valve chamber,
wherein the housing includes, in a first peripheral wall of the housing, a first inlet port having a first opening at the valve chamber and a second inlet port having a second opening at the valve chamber, a first fluid configured to flow into the first inlet port, a second fluid configured to flow into the second inlet port,
the rotor includes, in a second peripheral wall of the rotor, a first inflow pipe communicating with the first opening, a second inflow pipe communicating with the second opening, and a mixing pipe forming a mixing flow path through which the first fluid and/or the second fluid flow as a mixed fluid,
the mixing pipe opens in a radial direction of the rotor and communicates with the first inflow pipe and the second inflow pipe to allow the mixed fluid to flow into the mixing pipe, and
the first peripheral wall of the housing is provided with a discharge port configured to discharge the first fluid and/or the second fluid that has flowed into the valve chamber without passing through the first inflow pipe and/or the second inflow pipe of the rotor, respectively, as a discharge fluid to the outside of the housing, and an outlet port communicating with the mixing pipe.

2. The mixing valve according to claim 1,
wherein the outlet port has a third opening at the valve chamber,
the mixing pipe includes a connecting portion connected to the second peripheral wall and an opening end coming into slide contact with an inner circumferential surface of the housing with rotation of the rotor, and
an opening area of the mixing pipe at the opening end is a size that allows communication with an entire region of the third opening in an entire rotation range of the rotor.

3. The mixing valve according to claim 2, wherein a third peripheral wall of the mixing pipe has an enlarged pipe shape with a diameter increasing from the connecting portion toward the opening end.

4. The mixing valve according to claim 2, wherein the first inlet port, the second inlet port, the outlet port, and the discharge port are provided to project in a radial direction of the housing from the first peripheral wall on a same radial-direction plane of the housing.

5. The mixing valve according to claim 4,
wherein when an intersection angle between a first line connecting a rotation center of the rotor to a center of the first opening in the radial direction and a second line connecting the rotation center to a center of the second opening in the radial direction is defined as a fluid inflow angle on the same radial-direction plane, and
an intersection angle between a third line connecting the rotation center to a center of an opening of the first inflow pipe in the radial direction and a fourth line connecting the rotation center to a center of an opening of the second inflow pipe in the radial direction is defined as a fluid mixing angle on the same radial-direction plane,
the fluid mixing angle is smaller than the fluid inflow angle.

\* \* \* \* \*